US00RE36335E

United States Patent [19]

Perry

[11] E Patent Number: Re. 36,335

[45] Reissued Date of Patent: Oct. 12, 1999

[54] FLEXIBLE CHAIR

[76] Inventor: Charles O. Perry, 20 Shorhaven Rd., East Norwalk, Conn. 06855

[21] Appl. No.: 08/786,994

[22] Filed: Jan. 23, 1997

Related U.S. Patent Documents

Reissue of:

[64] Patent No.: 5,383,712
Issued: Jan. 24, 1995
Appl. No.: 08/238,415
Filed: May 6, 1994

U.S. Applications:

[63] Continuation of application No. 07/793,357, Jan. 9, 1992, abandoned, which is a continuation-in-part of application No. 07/757,734, Sep. 11, 1991, abandoned, which is a continuation-in-part of application No. 07/506,716, Apr. 10, 1990, abandoned, which is a continuation-in-part of application No. 07/381,151, May 2, 1989, Pat. No. 5,009,466, which is a continuation-in-part of application No. 07/185, 707, Apr. 25, 1988, abandoned.

[51] Int. Cl.[6] ..... A47C 1/032

[52] U.S. Cl. ..... 297/448.2; 297/239; 297/295; 297/320; 297/342; 297/447.1; 297/354.11

[58] Field of Search ..... 297/239, 285, 297/286, 288, 295–297, 320, 342, 354.11, 447.1, 448.2

[56] References Cited

U.S. PATENT DOCUMENTS

| | | | |
|---|---|---|---|
| D. 102,099 | 11/1936 | Wexelblatt | 297/288 X |
| 142,145 | 8/1873 | Chichester . | |
| 346,454 | 8/1886 | Baldwin . | |
| 790,242 | 5/1905 | Yeager . | |
| 1,191,438 | 7/1916 | Kilburn . | |
| 1,791,453 | 2/1931 | Mies . | |
| 1,964,519 | 6/1934 | Knudsen . | |
| 1,989,426 | 1/1935 | Pollak . | |
| 2,266,897 | 12/1941 | Nordmark . | |
| 2,345,926 | 4/1944 | Fields et al. . | |
| 2,419,838 | 4/1947 | James . | |
| 2,512,353 | 6/1950 | Magaldino et al. . | |
| 2,532,025 | 11/1950 | Johnson . | |
| 2,586,951 | 2/1952 | Johnson . | |
| 2,617,471 | 11/1952 | Lorenz . | |
| 2,637,371 | 5/1953 | Boutin . | |
| 2,803,291 | 8/1957 | Meyer . | |
| 2,838,095 | 6/1958 | Deaton . | |
| 2,857,958 | 10/1958 | Wright . | |
| 2,874,755 | 2/1959 | Smith . | |
| 2,952,300 | 9/1960 | Cohen | 297/239 |
| 2,961,035 | 11/1960 | Lorenz . | |
| 3,095,238 | 6/1963 | Tarascon | 297/306 |
| 3,115,368 | 12/1963 | Springer et al. | 297/451 |
| 3,246,927 | 4/1966 | Klassen | 297/239 |
| 3,266,843 | 8/1966 | Feder | 297/440 |
| 3,316,016 | 4/1967 | Petersen | 297/239 |
| 3,334,942 | 8/1967 | Breslow | 297/1 |
| 3,446,532 | 5/1969 | Cramer | 297/312 |
| 3,482,874 | 12/1969 | Henebry et al. | 297/445 |

(List continued on next page.)

FOREIGN PATENT DOCUMENTS

| | | | |
|---|---|---|---|
| 464380 | 4/1946 | Belgium . | |
| 632397 | 12/1961 | Canada . | |
| 1249503 | 1/1989 | Canada . | |
| 0 173 372 | 7/1985 | European Pat. Off. . | |
| 0 295 214 | 12/1988 | European Pat. Off. . | |
| 60468 | 4/1954 | France | 297/288 |
| 1196751 | 5/1959 | France . | |
| 31 00 770 | 8/1982 | Germany . | |
| 88 021 | 10/1985 | Germany . | |
| 3635 811 A1 | 10/1986 | Germany . | |
| 73031 | 9/1984 | Israel . | |
| 208 410 | 6/1985 | New Zealand . | |
| 220 502 | 5/1987 | New Zealand . | |
| 610741 | 10/1948 | United Kingdom . | |
| 754209 | 8/1956 | United Kingdom . | |

*Primary Examiner*—Peter R. Brown
*Attorney, Agent, or Firm*—Limbach & Limbach L.L.P.

[57] ABSTRACT

A high density stacking flex chair is disclosed. A frame has a seat attached thereto, and a back pivotally attached thereto. The back is curved and can tilt backwards, but is limited by the frame which, through the back, has a lesser radius of curvature and is angled downward, thus providing stop action for back rotation.

33 Claims, 12 Drawing Sheets

U.S. PATENT DOCUMENTS

| | | | |
|---|---|---|---|
| 3,712,666 | 1/1973 | Stoll | 297/61 |
| 3,741,607 | 6/1973 | Cramer | 297/302 |
| 3,815,955 | 6/1974 | Gibilterra | 297/295 |
| 3,817,573 | 6/1974 | Facury | 297/125 |
| 3,822,079 | 7/1974 | Probber | 297/445 |
| 3,847,433 | 11/1974 | Acton et al. | 297/239 |
| 3,999,802 | 12/1976 | Powers | 297/447 |
| 4,131,315 | 12/1978 | Vogtherr . | |
| 4,522,444 | 6/1985 | Polloch | 297/239 |
| 4,529,246 | 7/1985 | Leib . | |
| 4,545,615 | 10/1985 | Kane . | |
| 4,548,441 | 10/1985 | Ogg . | |
| 4,570,994 | 2/1986 | Lowrey . | |
| 4,640,548 | 2/1987 | Desanta . | |
| 4,641,885 | 2/1987 | Brauning . | |
| 4,648,653 | 3/1987 | Rowland | 297/239 |
| 4,653,806 | 3/1987 | Willi . | |
| 4,711,491 | 12/1987 | Ginat . | |
| 4,732,424 | 3/1988 | Uredat-Neuhoff . | |
| 4,744,600 | 5/1988 | Inoue . | |
| 4,787,319 | 11/1988 | Dupraz . | |
| 4,819,986 | 4/1989 | Markus . | |
| 4,840,426 | 6/1989 | Vogtherr et al. . | |
| 4,880,273 | 11/1989 | Markus . | |
| 5,009,466 | 4/1991 | Perry . | |
| 5,131,715 | 7/1992 | Balles . | |
| 5,180,208 | 1/1993 | Lawandi . | |
| 5,308,142 | 5/1994 | Forslund, III et al. . | |
| 5,338,094 | 8/1994 | Perry . | |
| 5,383,712 | 1/1995 | Perry . | |
| 5,626,394 | 5/1997 | Perry . | |

FLEXIBLE CHAIR

Matter enclosed in heavy brackets [ ] appears in the original patent but forms no part of this reissue specification; matter printed in italics indicates the additions made by reissue.

RELATED APPLICATIONS

This application is a continuation of my prior application Ser. No. 793,357, filed Jan. 9, 1992, now abandoned which was a continuation-in-part of my prior application Ser. No. 757,734 filed Sep. 11, 1991, now abandoned which was in turn a continuation-in-part of Ser. No. 506,716 filed Apr. 10, 1990, now abandoned, which was in turn a continuation-in-part of Ser. No. 381,151 filed May 2, 1989, now U.S. Pat. No. 5,009,466 dated Apr. 23, 1991 which was in turn a continuation-in-part application Ser. No. 185,707 filed Apr. 25, 1988, now abandoned.

BACKGROUND OF INVENTION

This Invention relates to high density stacking chairs of the type used by hotels for meeting room chairs. Typically, a dolly is provided which holds a stack of chairs which are stacked as densely as possible.

The use of low-cost, stacking chairs is well-known in the art. However, such chairs are designed not with comfort or ergonomics in mind, but rather to provide a large quantity of temporary seats for occasional use which can ordinarily be stored and take up minimal storage space. Such chairs may have some limited flexibility in the seat back portion, but provide no ergonomic benefits.

Considerable attention has been focused in recent years on better ergonomic designs, resulting in home and office chairs which demonstrate a wide variety of designs which include the ability to recline and provide lumbar support. See, for example, U.S. Pat. No. 4,732,424. Such ergonomic designs do not, however, provide low cost seating. Thus, it would be desirable to combine the benefits of ergonomic design into a low cost, stackable chair.

SUMMARY OF INVENTION

I have disclosed a new design for high density stacking chairs which provides exceptional comfort with exceptional stacking density by using a flexible frame which flexes to permit partial reclining of the chair back. At the same time, the partial reclining of the chair back applies pressure to the user's low back. This high density stacking flex-chair is available on the market as the Perry Chair manufactured by the Krueger International Company of Green Bay, Wis.

In one embodiment of the invention, a single continuous frame has a seat and a pivoting back attached thereto. Ergometric adjustment of the chair is accomplished by tilting of the back and flexure of the frame. Flexure of the frame urges the back into a normal upright position for stacking and uniform appearance. The back is curved and hollow, and engages the frame at upper and lower curved sections of the frame, which sections have radii of curvatures less than that of the back and which sections are positioned at a downward angle such that the effective horizontal radii of the sections in the upright position is shorter than the actual radii, causing the back to rest against the curved sections and limit forward tilting of the back. When the back is tilted, the radial movement disengages the back from the curved sections due to the difference in radii, until the angle of tilt is such that the effective radii are again equal and the back again rests against the curved sections of the frame and limits tilting backward.

In an alternative embodiment of the invention, the high density flex chair is an armchair. I have accomplished this result simply by changing the shape of the rear legs so that the chair not only has the advantage of being an armchair but also has the advantage that it can be manufactured to some extent with tooling common to the manufacturing tooling of the armless chair.

DETAILED DESCRIPTION OF THE INVENTION

Figure 1:
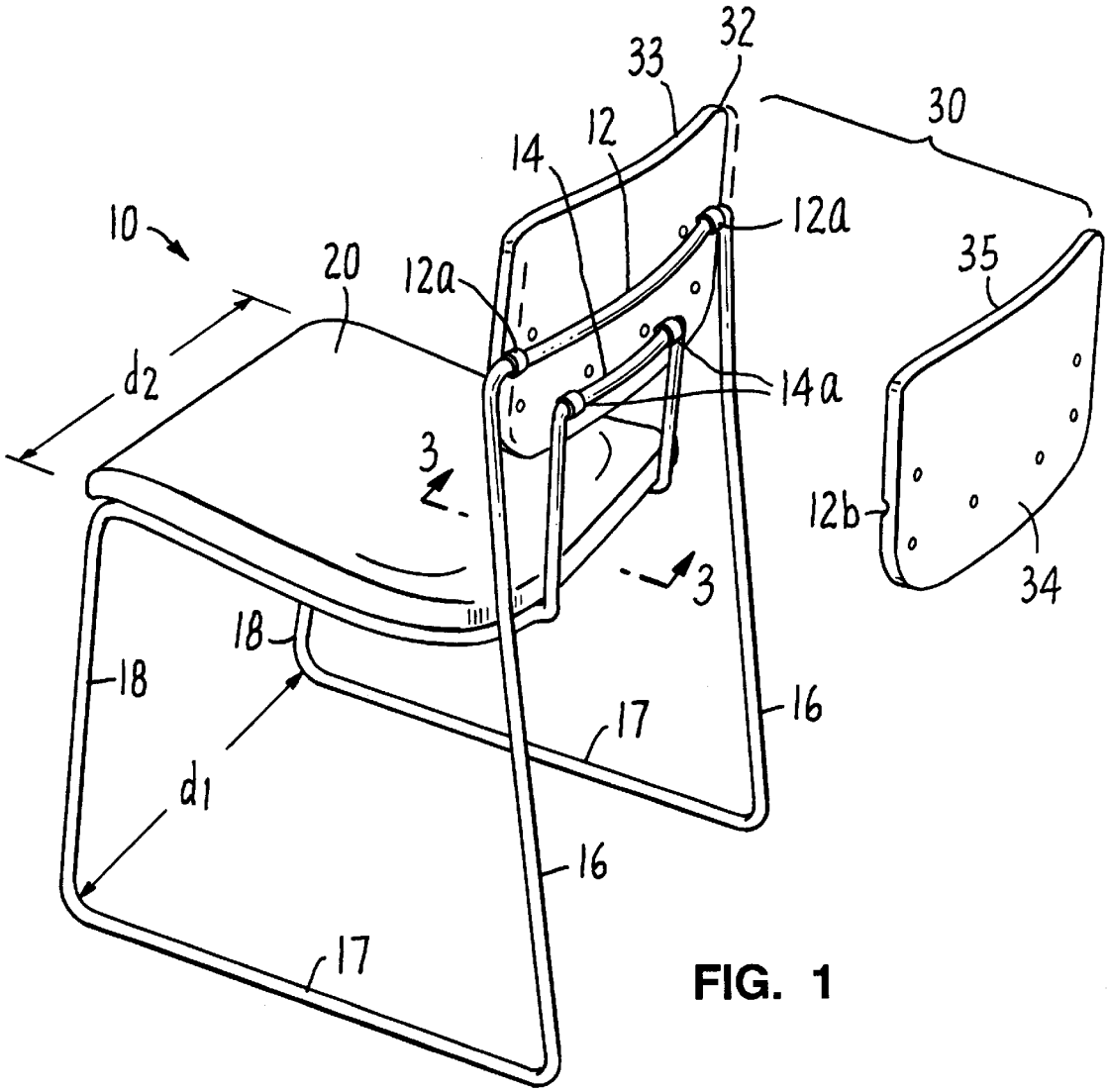
FIG. 1 is a perspective view of a chair built according to the present invention.

Referring now to FIG. 1, a first embodiment of a chair according to the present invention is shown. There are three major portions of the chair: a frame 10, a seat 20, and a back 30. The back 30 is curved to adapt to a user's back and is composed of a front section 32 and a rear section 34, each of which has a lip 33, 35 or other spacer which creates a hollow interior space between sections when they are attached.

The frame 10 is ideally a continuous structure, constructed of solid rod or tubular steel or the like. Alternatively, it may consist of welded or otherwise connected sections. The frame 10 has an upper curved section 12 which is enclosed within the back 30 with cylindrical bearing sections 12a at either end and which extends through the middle of the back and is angled downward. The frame 10 then extends from each end of the upper curved section 12 outward from the hollow interior, the back 30 being pivotally attached thereto at the cylindrical sections 12a. This pivotal attachment can be accomplished by bearings attached to the front section 32, but is preferably accomplished by providing bearing surfaces 12b formed on plastic molded front and back sections 32 and 34.

The frame 10 has a pair of rear support legs 16 which extend downward and rearward to a floor surface. Bottom legs 17 extend forwardly along the floor. A pair of front support legs 18 then extend upward and rearward to the front of the seat 20. The seat supporting portion 15 extends rearward supporting the seat 20, then slightly inward, then upward into the back 30, then inward, where the back is again pivotally attached at pivot connections 14a. The frame 10 continues to a lower curved section 14 which is enclosed within the back and which extends through the back at a downward angle. The distance $d_1$ between the opposing legs of the frame 10 as it sits on the floor is less than the width $d_2$ of the seat 20, so as to facilitate stacking a plurality of such chairs.

Figure 2:
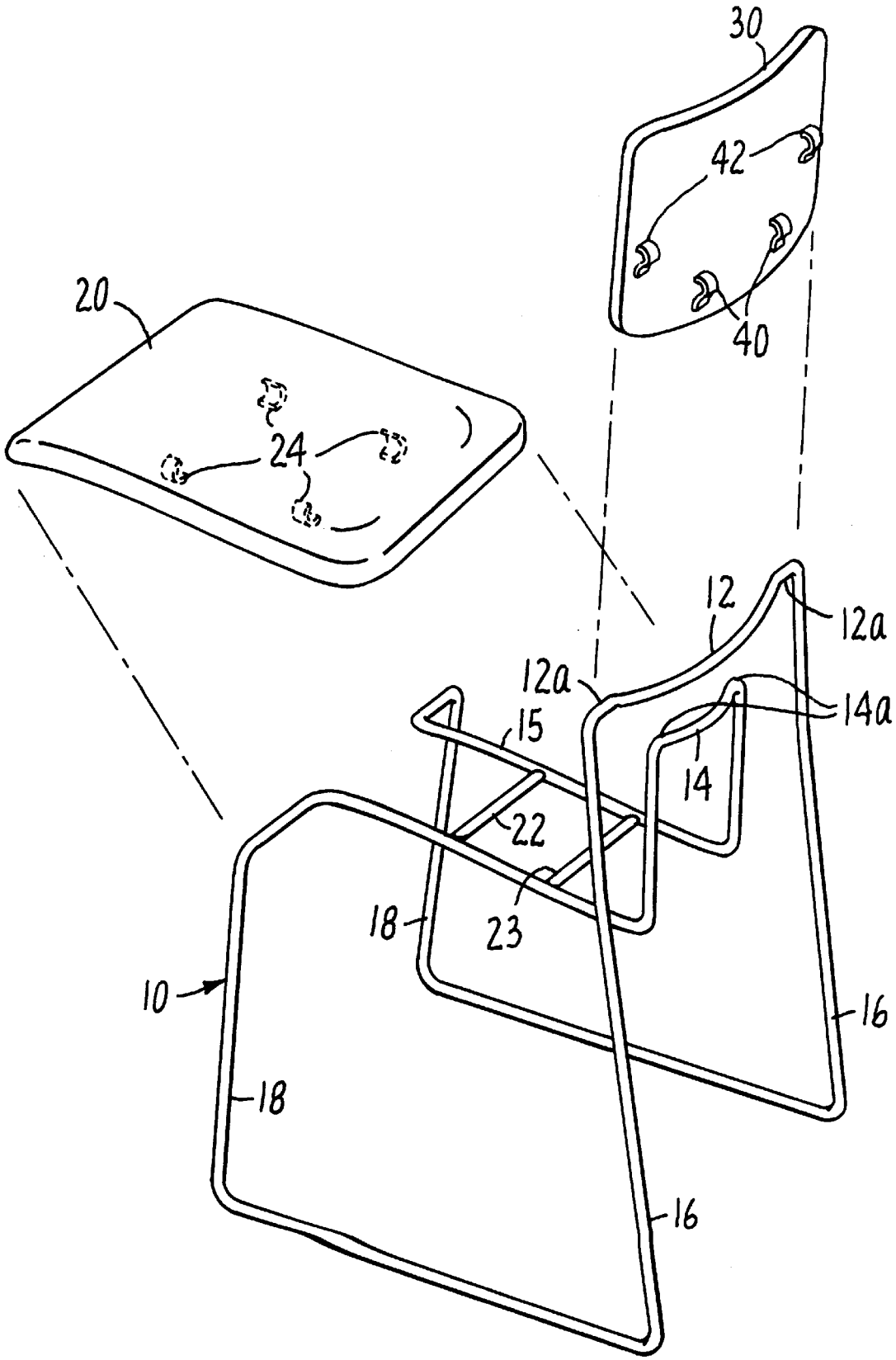
FIG. 2 is a perspective view showing a variation of a chair built according to the present invention.
Figure 7:
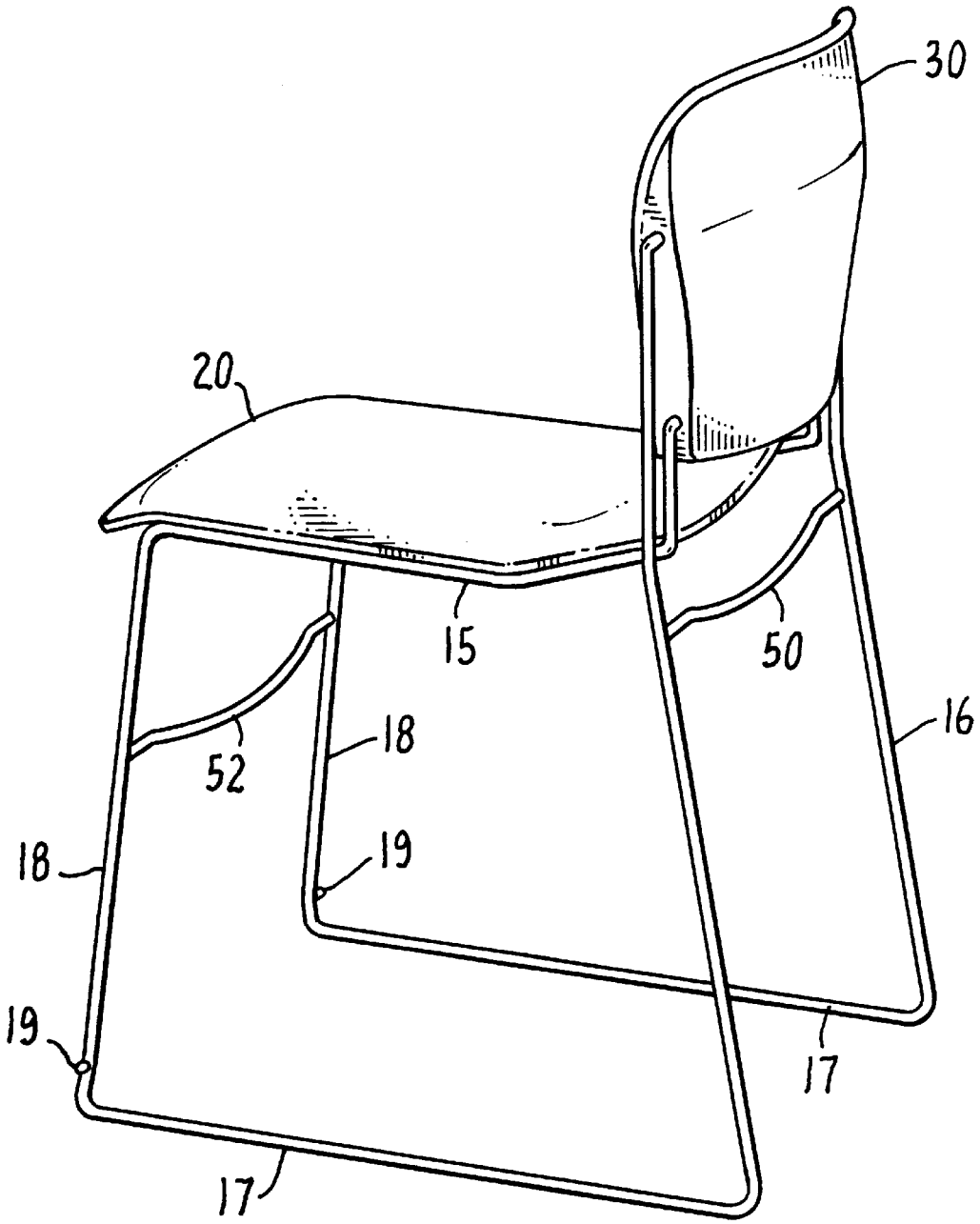
FIG. 7 is a perspective view of a chair built according to the present invention.

In the embodiment of FIG. 2, the seat supporting portion 15 of the frame 10 is positioned inwardly from the edges of the seat 20 and connected by welded struts 22, 23 to improve the support of the seat and lateral stability of the frame. In FIG. 7, such lateral stability can be provided by a pair of stabilizers 50, 52. Additionally, clips 24 are attached to the bottom surface of the seat 20 in order to easily attach/detach the seat to frame 10.

The back 30 is a one-piece molded unit, having openings or clips 40 which are adapted to pivotally engage the rear support legs 16 at cylindrical sections 12a. Openings or clips 42 are likewise adapted to pivotally engage the front support legs 18 at cylindrical sections 14a. In this way, the back 30 may be easily and securely fitted to frame 10. The curved sections 12 and 14 remain in a fixed position relative to frame 10 to provide pivotal limits, as will be next described.

Figure 3:
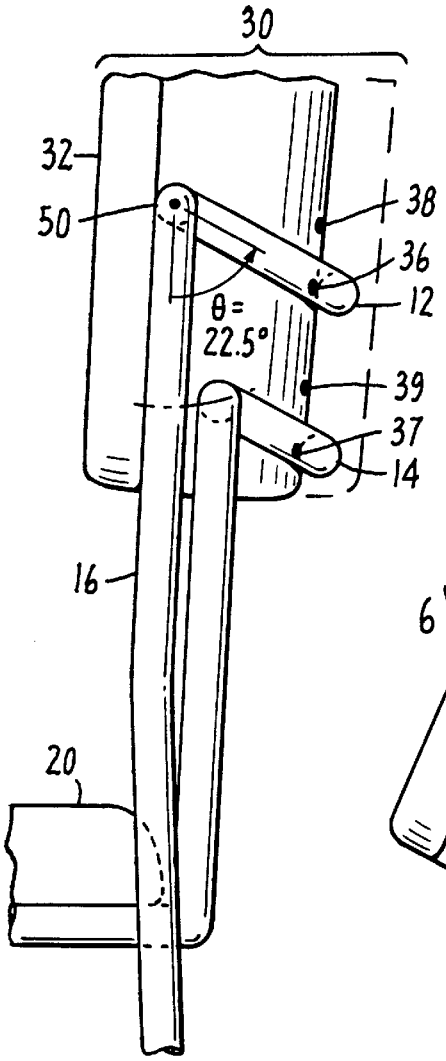
FIGS. 3–5 are side plan views showing how the chair back flexes through its range of backward tilt.
Figure 4:
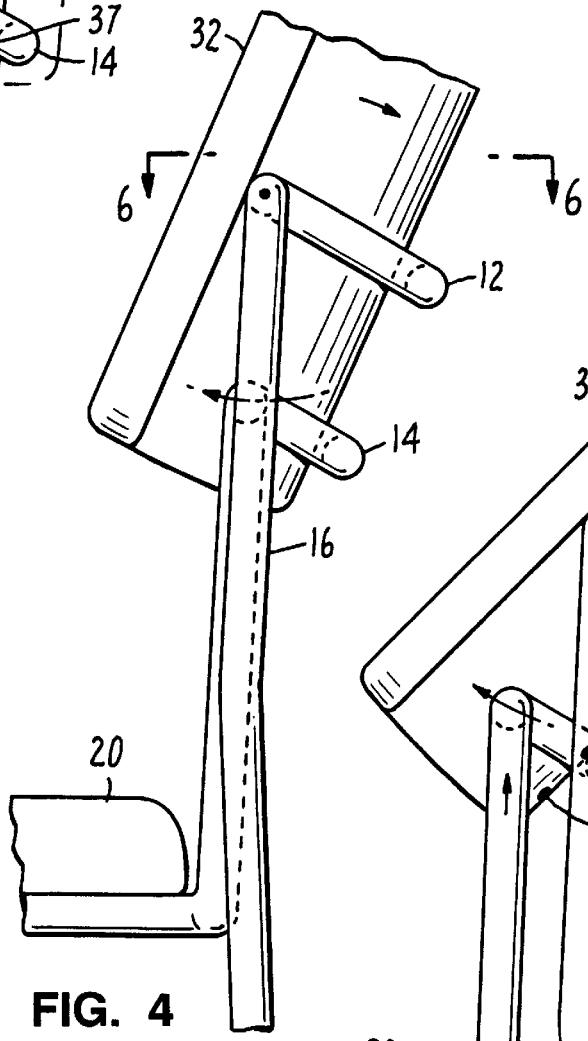
Figure 5:
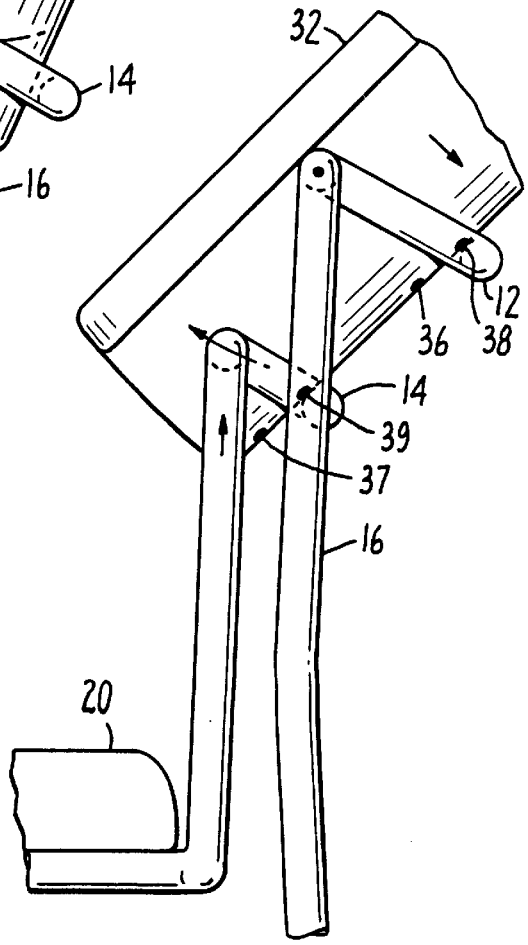

Referring now to FIGS. 3–5, the tilting action of the back 30 is illustrated. When the chair is in its upright position, as in FIG. 3, the rear support legs 16 of the frame 10 are inclined at a forward angle so as to provide a natural spring-type action which holds the back 30 forward.

The curved sections 12 and 14 of frame 10 are parallel, each extending outward and downward from the back of the front section 32 at a twenty-two and one-half degree angle. The radii of curvature for both curved sections 12 and 14 are less than that of the back portion. But, the radius of curvature of section 12 projected at a plane inclined to the plane of section 12 by an angle of 22.5 degrees equals the radius of curvature of the back 30, such that the inside of the front section 32 is in contact with the curved sections 12 and 14 at points 36 and 37 as a result of the effective radius of the curved sections 12 and 14 being equal to the radius of the back 30.

As a user leans back on the chair, the front section 32 pivots about point 50 on the upper curved section, causing the upper half of the front section to rotate backwards, and the lower half to rotate forward about point 50. Note also that the seat 20 will be lifted by the forward rotation of the lower curved section 14. Since the back 30 has a greater radius of curvature than both curved sections, the back lifts away from the curved sections as it is tilted, reengaging the curved sections at points 38 and 39, located further down the back, where the effective radius of the back portion is again equal to the radii of the curved sections after the back has tilted 45 degrees.

Figure 6:
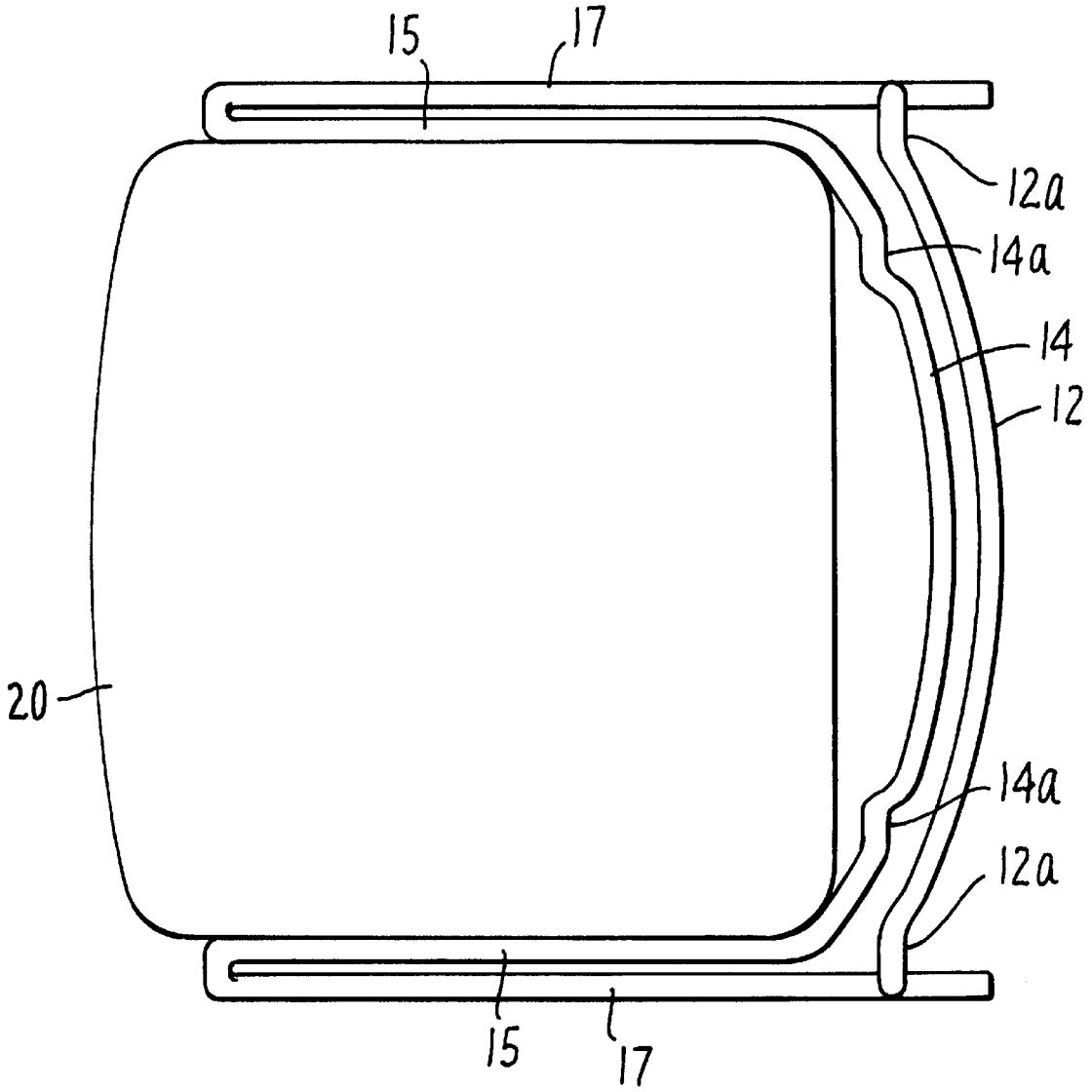
FIG. 6 is a view taken across section 6—6 of FIG. 4 (seat back omitted) and represents a plan view of the chair according to the present invention in a partially tilted position.

A clearer view of the relationship of the curved sections 12 and 14 to the overall frame structure 10 is illustrated in FIG. 6 where the cylindrical sections of the frame 12a, 14a are providing straight bearing areas.

Figure 8:
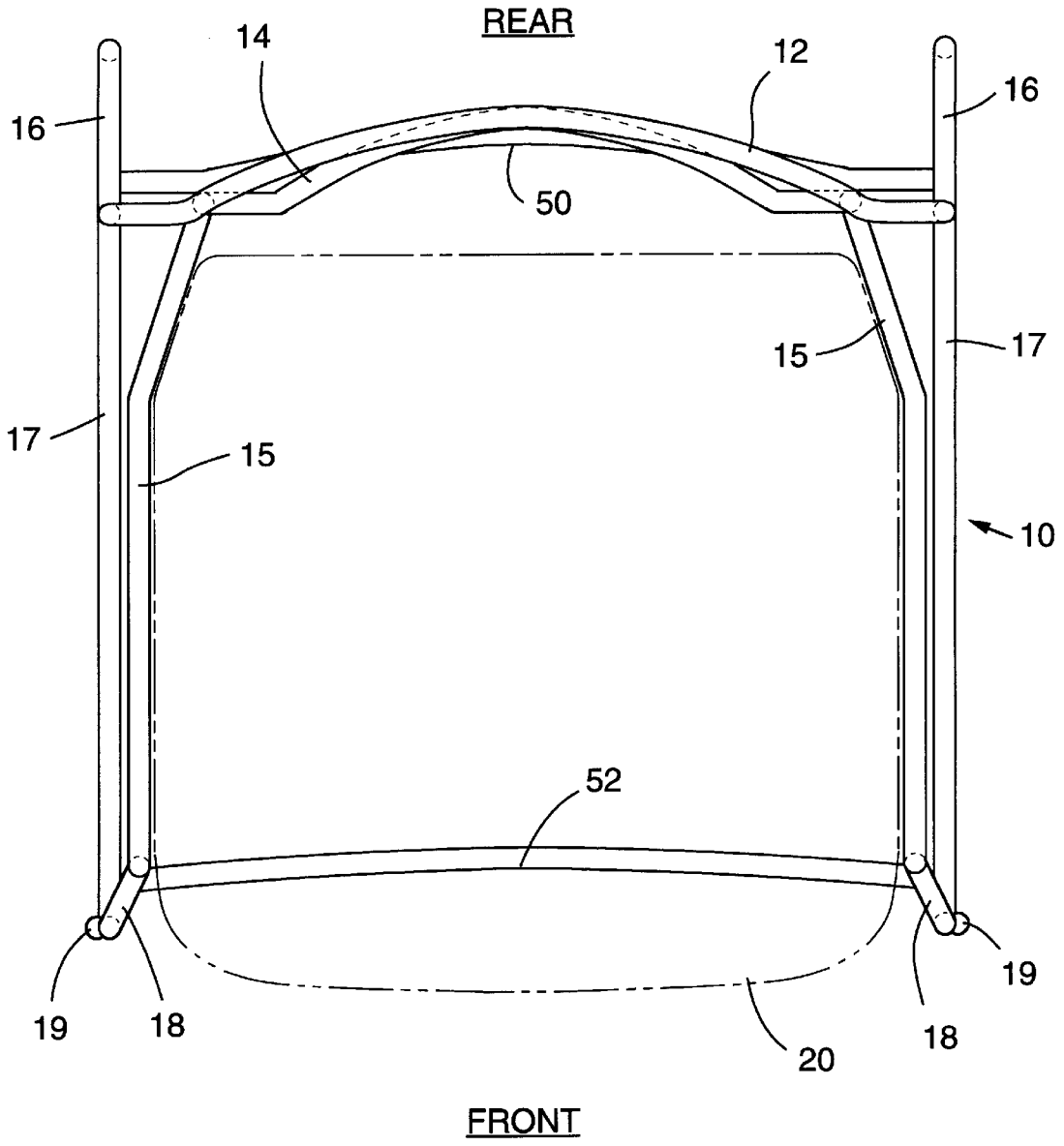
FIG. 8 is a top plan view (seat back omitted) of a chair built according to the present invention in the normal rest position.
Figure 9:
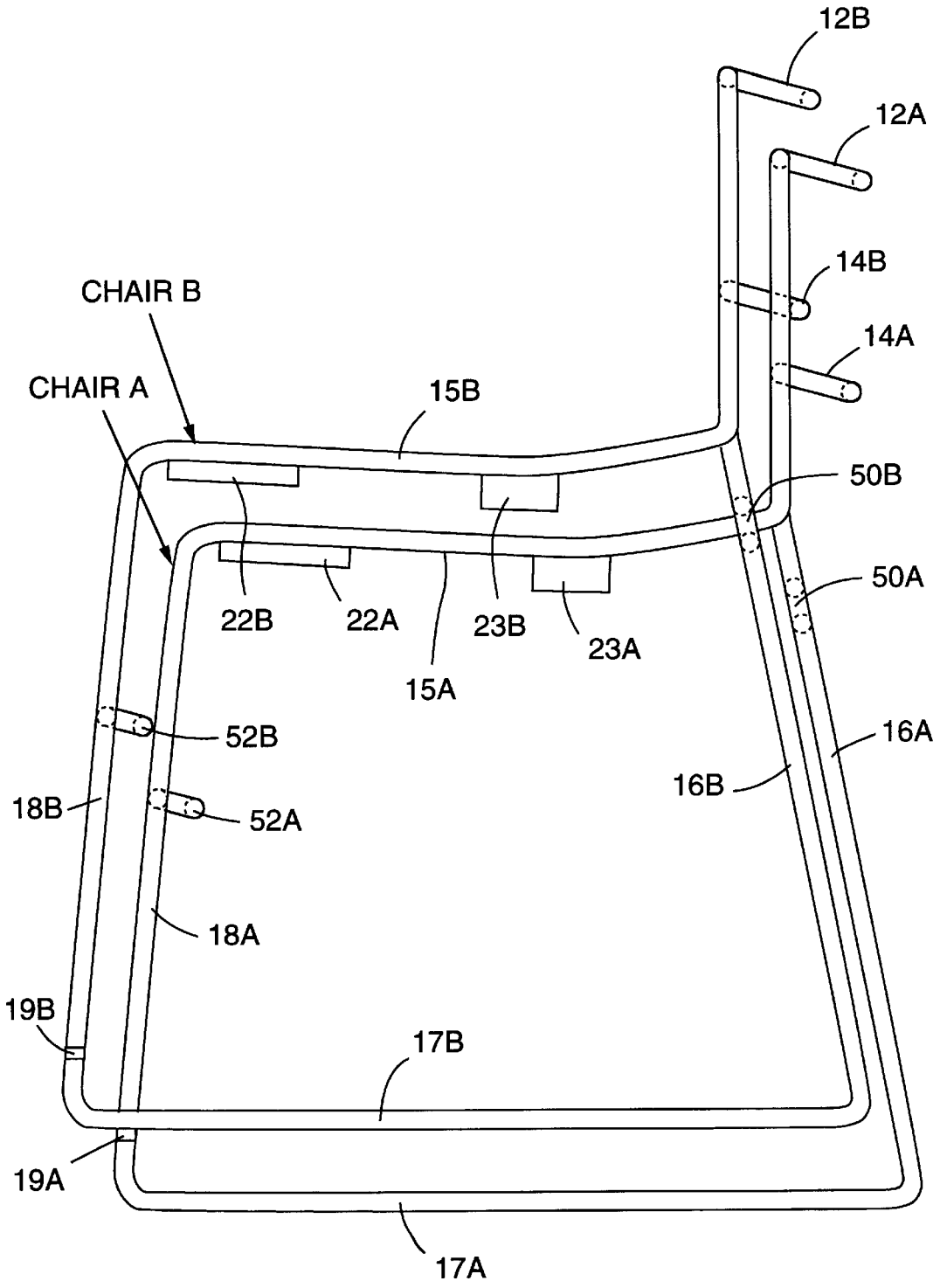
FIG. 9 is a side plan view of a stack of two chairs according to the present invention.

Stacking of the chair of the present invention is illustrated with reference to FIGS. 8–10. As can be seen in FIGS. 8 and 9, the seat supporting portions 15 of frame 10 are positioned inwardly but substantially parallel of the floor engaging or bottom portions 17 of frame 10. The rear portions of seat supporting portions 15 are angled further inward in conformance with the shape of the seat 20, and then rise upward forming lower curved section 14. The front portions of seat supporting portions 15 turn downward near the front of the seat 20 forming front support legs 18. The front support legs 18 are substantially vertical, thus remaining inward of the bottom legs 17. However, near the floor each front support leg 18 is bent outwardly at a slight angle to form into the bottom legs 17. A stacking tab 19 is welded on the outside near the bend of each front support leg 18 to provide for indexed stacking of chairs.

Figure 10:
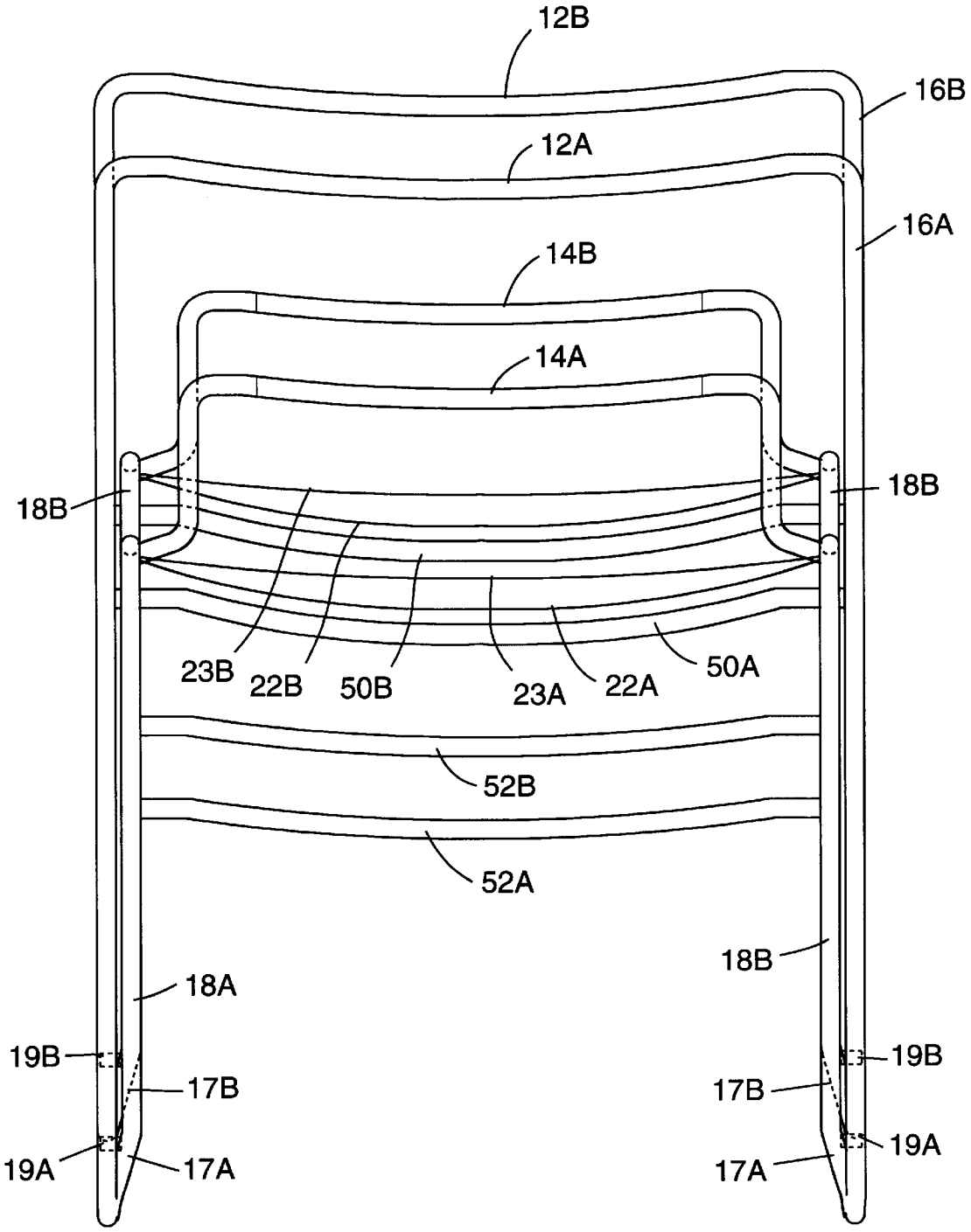
FIG. 10 is a rear plan view of the stack of FIG. 9.

In FIGS. 9 and 10, chair B is stacked on top of chair A. It can be seen that the front corner of the bottom legs 17B rest on spacing tabs 19A. Further, rear stabilizer 50B, which has a radius of curvature similar to the seat 20, rests in the opening between the seat 20 and back 30. It will be noted that the upper chair B is offset forwardly from the lower chair A so that the seats of a stack of chairs will occupy a volume which extends upwardly and forwardly, and the bottom legs 17 lay outside the volume. Thus, the bottom legs 17B are wider at the front end thereof than the front legs 18A and are wider at the rear end thereof than the volume occupied by the stack of chairs, such that chair A and chair B stack tightly and neatly.

Figure 11:
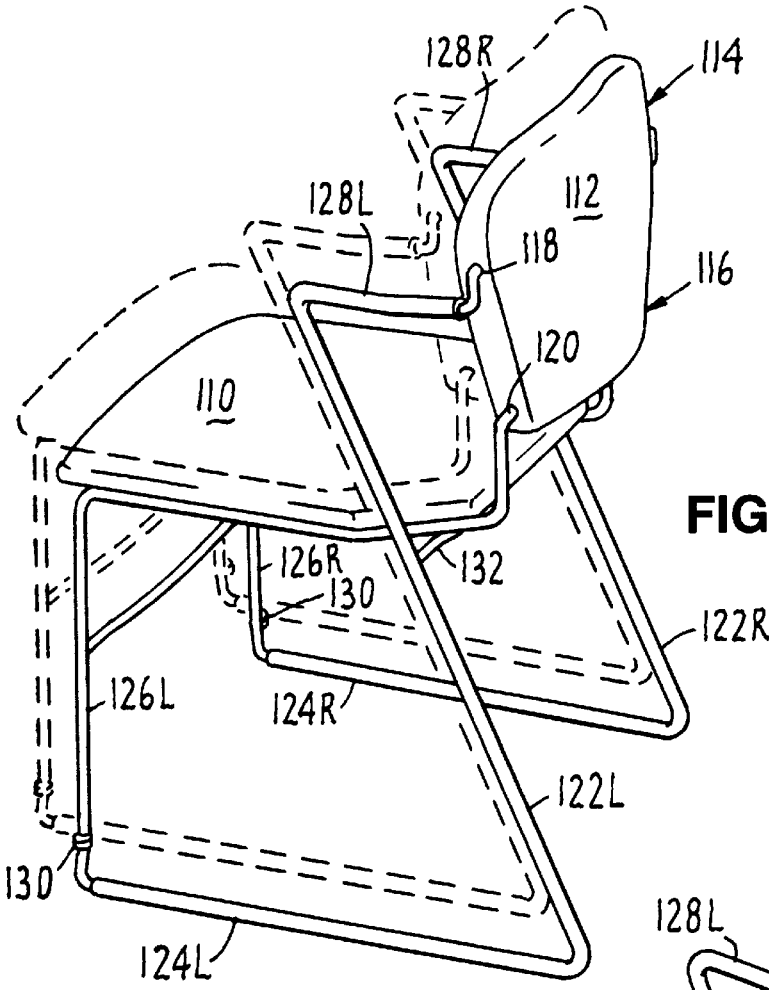
FIG. 11 is a perspective view of an alternative embodiment of the chair of this invention illustrating in phantom a second chair stacked on top of the first chair.
Figure 12:
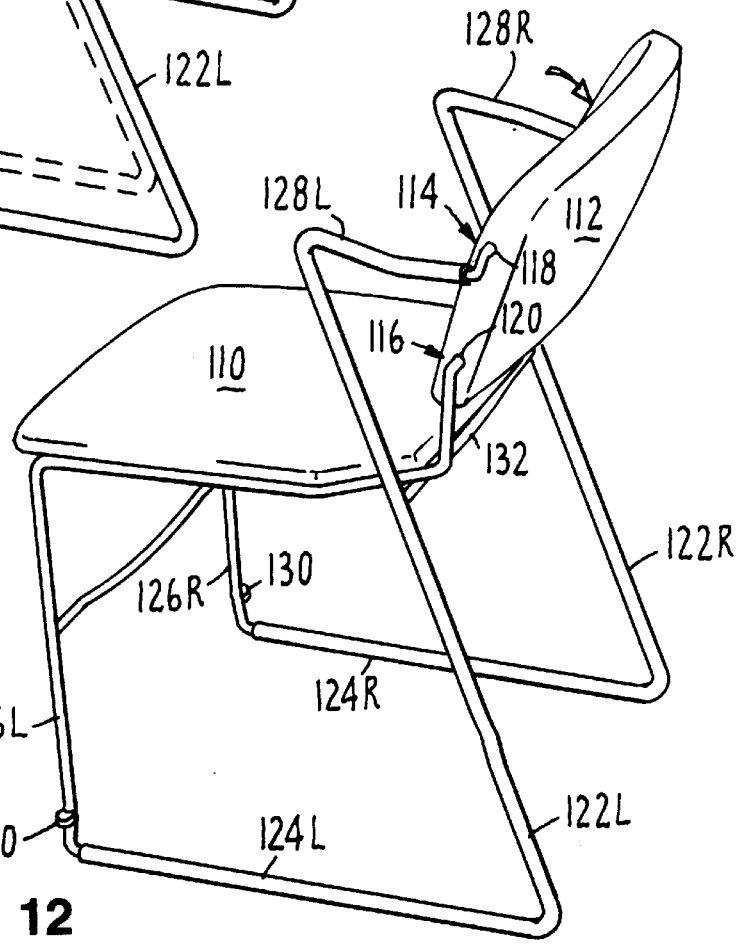
FIG. 12 is a perspective view similar to FIG. 11 showing the manner in which the chair of FIG. 11 reclines.

Referring now to FIG. 11, the chair illustrated therein comprises a seat 110 and a back 112 which has an upper region 114 and a lower region 116. The chair has a metal frame which is preferably made of 7⁄16 inch 1008 steel rod and 5⁄8 inch steel tube with a 3⁄32 inch wall thickness. The rod portion of the frame is generally the same as the frame of the armless chair with the back and bottom leg portions replaced by the tube. The frame is pivotally connected to the upper region of the back at 118 with a pivotal connection 120 between the seat 110 and the lower region 116 of the back 112.

The frame has a pair of legs each having a back leg portion 122, a bottom leg portion 124 and a front leg portion 126 which are labeled with the letters "R" and "L" for the right and left legs with the top of the front legs 126 supporting the seat 110. The pivotal connections 118 and 120 between the fame and the back 112 are preferably provided by the pivot limiting structure of the chair which is generally shown in FIGS. 3–5 and the connection between the frame and the seat 110 is preferably provided in the same manner as the connections in the commercial armless chair so that the two chairs can be made with similar manufacturing tooling.

Figure 14:
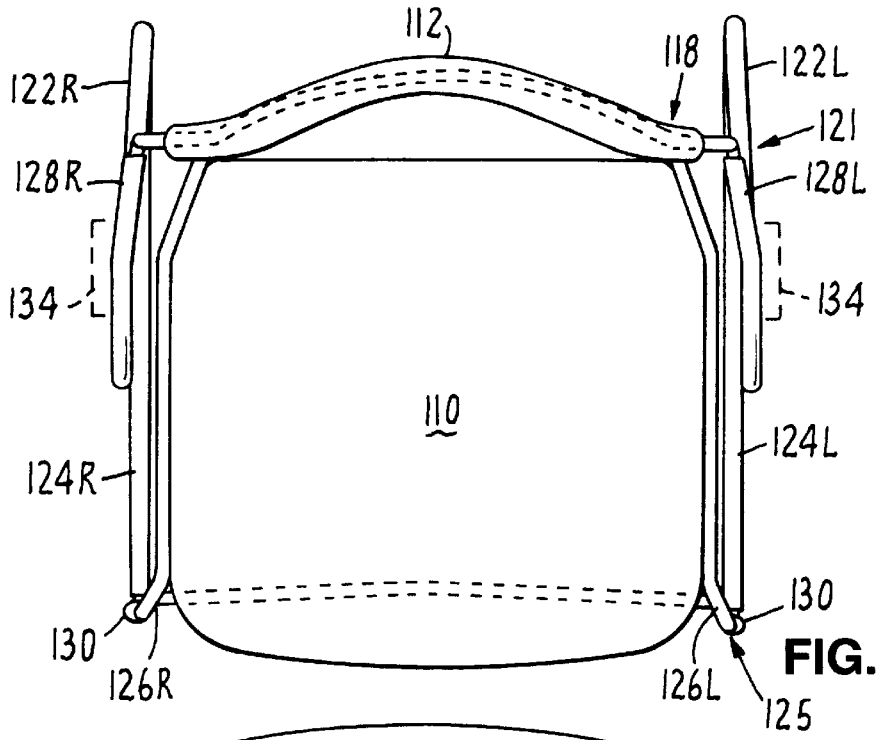
FIGS. 14 and 15 are top and front elevational views of the chair of FIG. 11, respectively.
Figure 15:
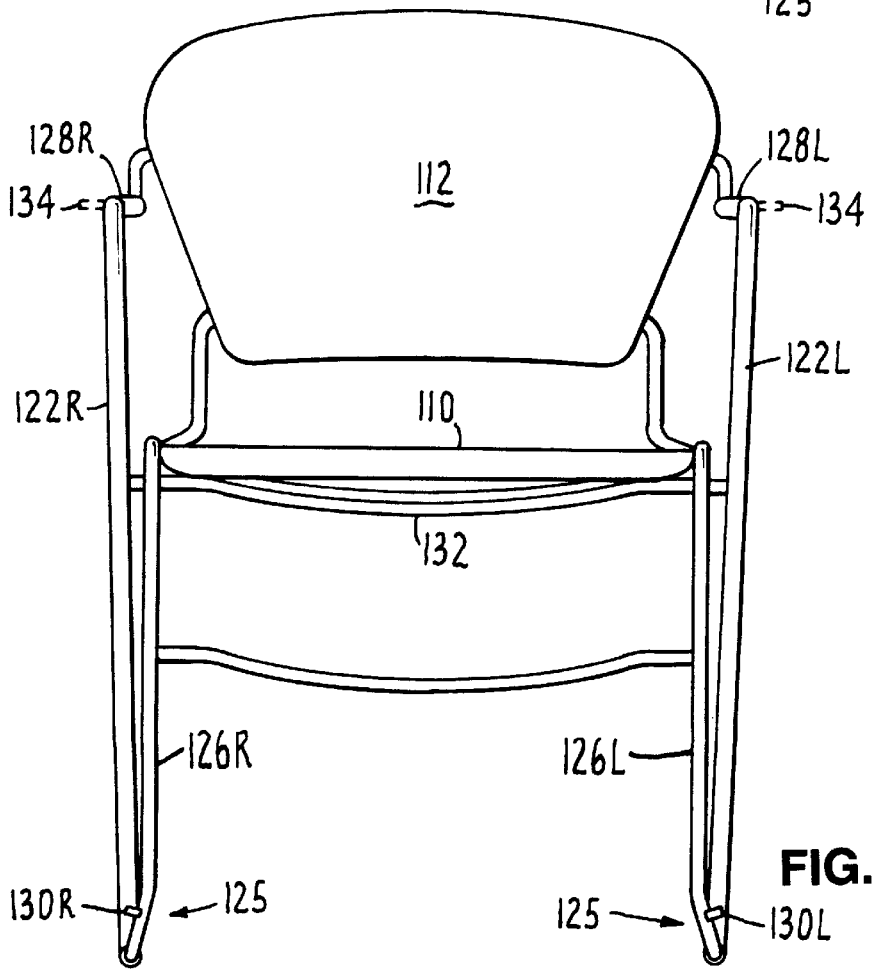
Figure 16:
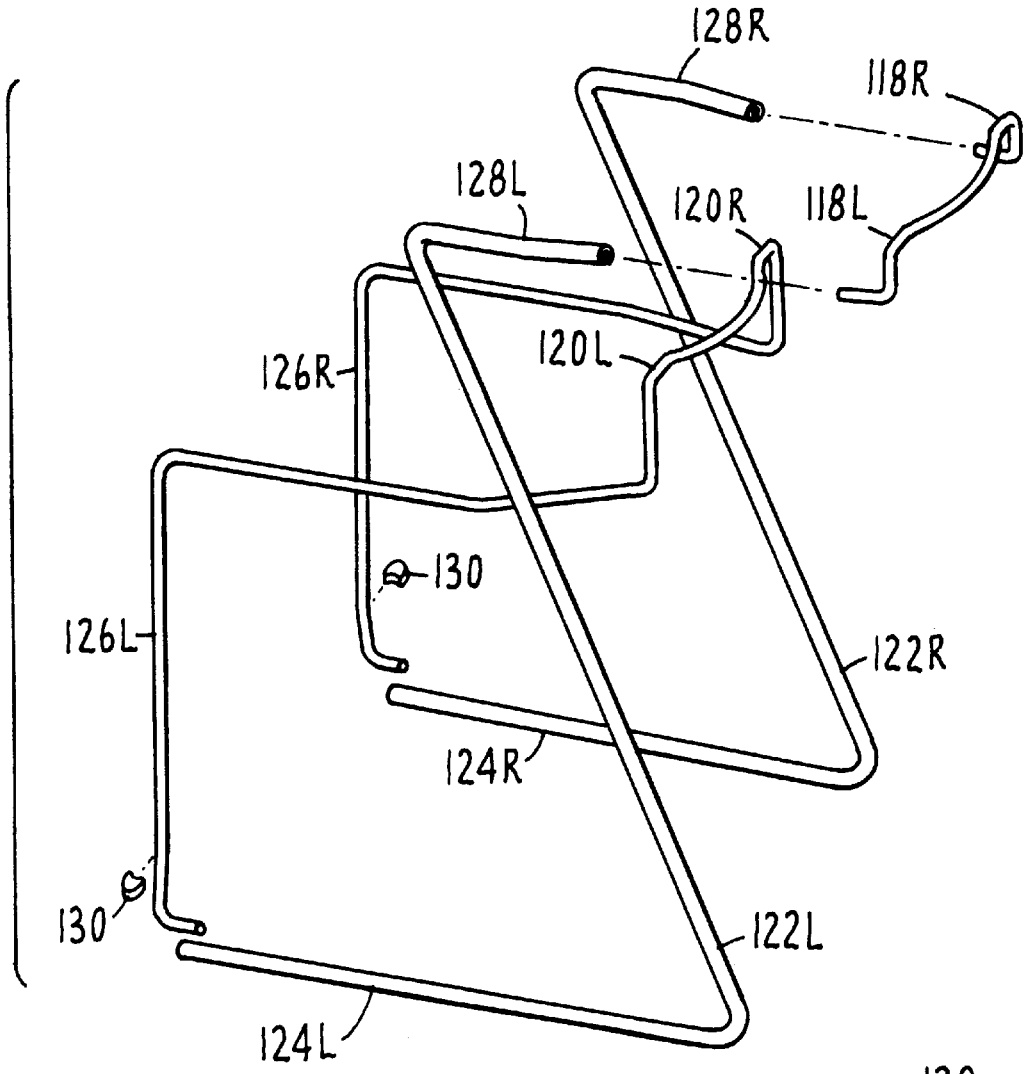
FIG. 16 is in exploded view of the frame of the chair of FIG. 11.

The chair of this embodiment differs from the chair shown in FIG. 7 in that the back leg portions 122 extend from the pivot connection 118 forwardly generally outside the bottom leg portion 174 for a sufficient distance to form an arm rest 128 and then downwardly and rearwardly to the bottom leg portion 124, and the back leg portions, arms and bottom leg portions are made of tubing which slips over the rod portion of the frame and is welded to the rod at welds 121 and 125. Note that there is a slight horizontal bend in the arm 128, best seen in FIGS. 14 and 16 which position the forward part of the arm outside the bottom leg portions.

Figure 13:
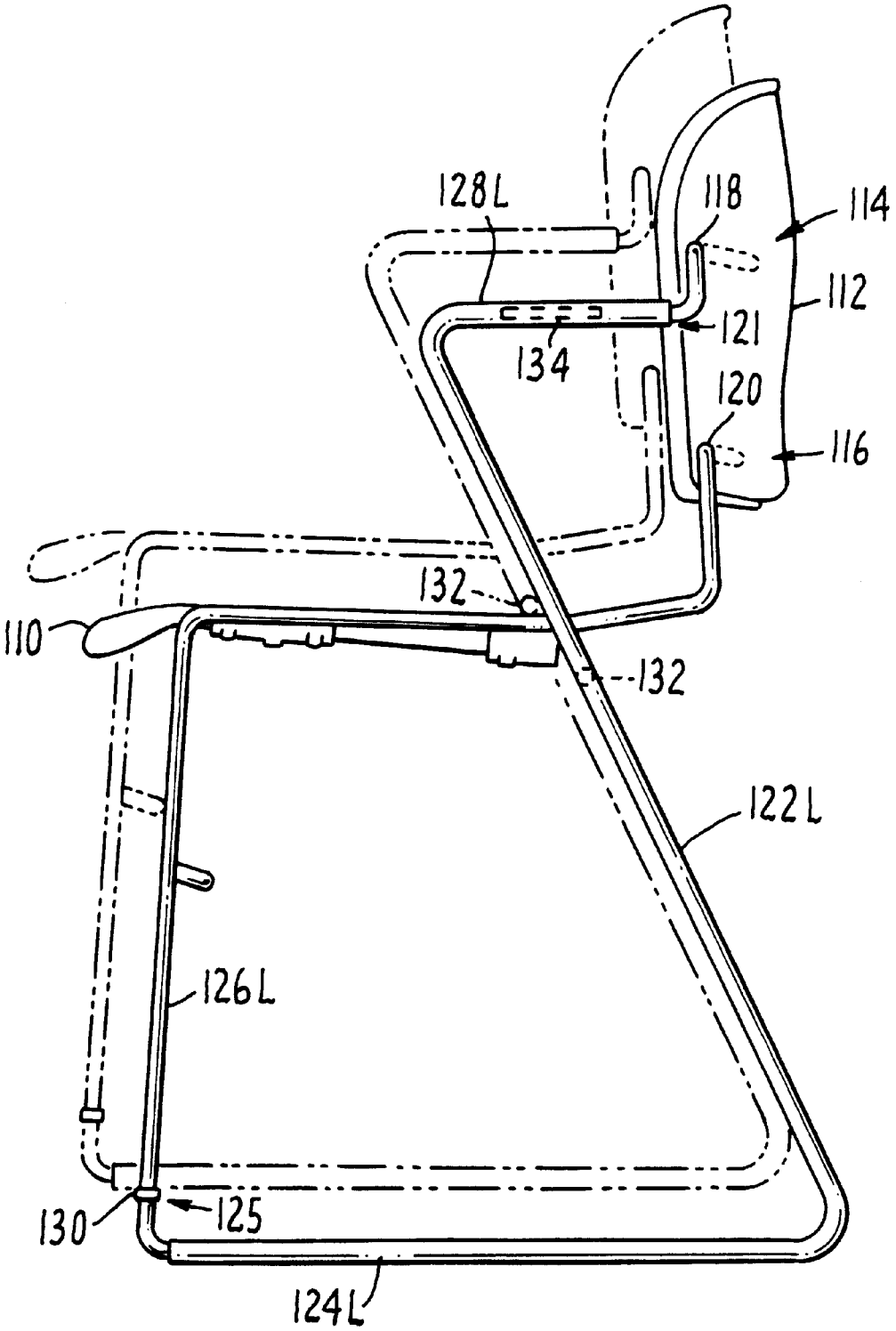
FIG. 13 is a side elevational view of the chair and phantom chair of FIG. 11.
Figure 17:
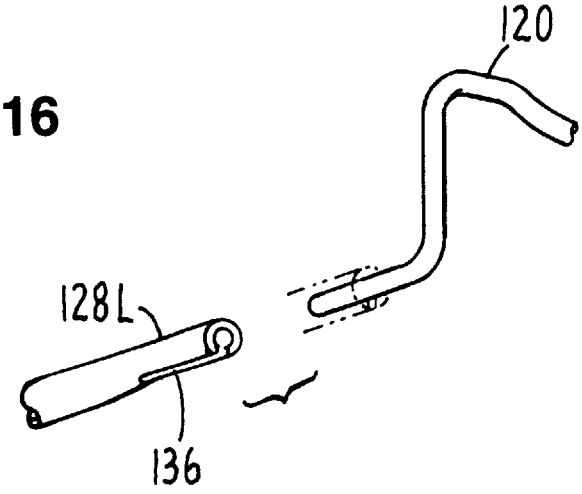
FIG. 17 is a detailed view of a part of FIG. 6.

Stops are provided on the chair frame for stabilizing the chair in a stack. These stops comprise a pair of tabs 130 on the front legs 126 which support the bottom leg portions of an upper chair in the stack and a cross strut 132 (see particularly FIG. 13) which engages the top of the seat of a lower chair in the stack. Preferably the frame also has a metal tab 134 on each chair arm to which a padded armrest may be attached. As illustrated in FIG. 17, a slot 136 is provided in the tube to permit the tube to drain where the frame may be plated after welding.

While several embodiments of the chair of this invention has been described in the drawings, it will be apparent that certain modifications may be made thereof within the spirit of the following claims.

I claim:

1. A flexible armchair, comprising:

a. a seat adapted to engage a user's seat;

b. a back generally perpendicular to said seat and adapted to engage a user's back and having a top and a bottom and upper and lower regions between the top and bottom; and c. a flexible fame for holding and supporting said seat and back, characterized by said frame comprising:

i. a pair of support legs one at each side of the seat with each support leg having, (1) a resilient back leg portion pivotally connected to the upper region of said back below the top, (2) a bottom leg portion for extending along a floor surface, and (3) a front leg portion extending upwardly to the front of said seat to support said seat, and ii. pivotal connecting means connecting the rear of the seat to the lower region of said back at a location substantially above the seat, wherein the flexibility of the frame and the pivotal connecting means permit the back to tilt toward a reclining position while the back functions as a lever against the resiliency of the back leg portion forcing the bottom of the back forwardly for lumbar support, characterized in that:

d. said back leg portion extends forwardly from said upper region of said back above the seat and outside the bottom leg portion for a sufficient distance to form an arm rest and then downwardly and rearwardly to said bottom leg portion.

2. A high density stacking flexible arm chair as in claim 1 characterized further by the inclusion of stop means for stabilizing the chair in a stack comprising a pair of tabs on the front leg portions for engaging the bottom leg portions of an upper chair in a stack and a strut extending between the rear leg portions below the seat for engaging the seat of a lower chair in a stack.

3. A chair, comprising:

a. a seat portion having a shape adapted to engage a user's seat;

b. a back portion generally perpendicular to said seat portion and adapted to engage a user's back and having upper, intermediate and lower regions;

c. a frame for holding and supporting said seat and back portions, said frame comprising:

i. a pair of rear support legs each pivotally connected to the intermediate region of said back portion and extending downward to a floor surface with said rear support legs spaced apart more than the width of the seat portion; and ii. a pair of front support legs each pivotally connected to the lower region of said back portion and extending forward to support said seat portion, and downward to said floor surface;

whereby the weight of the user urges the back portion to pivot with respect to the frame toward an erect position and pressure of the user's back against the upper region of the back portion can pivot the back portion toward a tilted position.

4. The chair of claim 3, further comprising at least two stabilizers each attached between respective front and rear support legs at the floor, such that said front and rear support legs effectively form a continuous structure.

5. The chair of claim 3, further comprising at least two stabilizers, one attached between the front support legs and the other between the rear support legs at a position above said floor surface.

6. The chair of claim 3, further comprising at least two stabilizers each attached between any two opposing support legs.

7. The chair of claim 3, wherein said back portion is curved to conform to a user's back.

8. The chair of claim 7, wherein said back portion comprises a front and rear section which are attached together, such that the attachment of said front and rear support legs to said back portion is enclosed within said front and rear sections of said back portion.

9. The chair of claim 8, wherein at the point of attachment of said rear support legs to said back portion, said rear support legs turn inward to face each other, and wherein at the point of attachment of said front support legs to said back portion, said front support legs turn inward to face each other, and wherein said frame further comprises:

a. a first curvilinear section attached to each of said rear support legs at said back portion and extending across the intermediate region of said back portion at a downward angle, wherein said first curvilinear section has a radius of curvature less than that of said back portion, and wherein said back portion is pivotally attached to said rear support legs and first curvilinear section;

b. a second curvilinear section attached to each of said front support legs at said back portion and extending across the lower region of said back portion at a downward angle, wherein said second curvilinear section has a radius of curvature less than that of said back portion.

10. The chair of claim 9, wherein said front and rear sections of said back portion form a hollow interior space such that said first and second curvilinear sections have limited clearance within said space to allow said back portion to be tilted about said first curvilinear section, such that when a user leans back, thus exerting rearward pressure on the back portion, said back portion will tilt at a rearward angle about said first curvilinear section, such tilting causing said seat portion to raise up in response to the pulling action exerted on said section curvilinear section.

11. The chair of claim 10, wherein said first and second curvilinear sections are positioned at a downward angle parallel to each other and whereby the curvilinear sections provide the pivotal limits for forward and backward tilting of the back portion, such that said front section of said back portion abuts and is stopped by said curvilinear sections when said back portion is in an upright position, and whereby the tilting of said back portion causes the interior of the back portion to move away from said curvilinear sections in a radial fashion, reengaging said curvilinear sections at an angle determined by the relative radius of curvatures between said back portion and said curvilinear sections.

12. The chair of claim 8, wherein said front and rear support legs are pivotally connected to said back portion through corresponding openings in the front and rear sections of said back portion.

13. The chair of claim 12, wherein said front and rear sections of said back portion form a hollow interior space such that said first and second curvilinear sections have limited clearance within said space to allow said back portion to be tilted about said first curvilinear section, such that when a user leans back, thus exerting rearward pressure on the back portion, said back portion will tilt at a rearward angle about said first curvilinear section, such tilting causing said seat portion to raise up in response to the pulling action exerted on said section curvilinear section.

14. The chair of claim 13, wherein said first and second curvilinear sections are positioned at a downward angle parallel to each other and whereby the curvilinear sections provide the pivotal limits for forward and backward tilting of the back portion, such that said front section of said back portion abuts and is stopped by said curvilinear sections when said back portion in an upright position, and whereby the tilting of said back portion causes the interior of the back portion to move away from said curvilinear sections in a radial fashion, reengaging said curvilinear sections at an angle determined by the relative radius of curvatures between said back portion and said curvilinear sections.

15. The chair of claim 14, further comprising:

stop means for limiting relative pivotal movement of the back with respect to the legs between an upright position determined by the stop means and a reclined position with the back held in the upright position by the resiliency of the legs.

16. The chair of claim 15, wherein said back has a curved surface, and said stop means comprises a curved rod connected between the support legs for pivotal movement with respect to the back as the back pivots with respect to the legs with the rod having a radius of curvature less than the radius of curvature of the back and engaging the back along an elongated common curve, whereby the rod limits pivotal movement of the back in one direction and permits limited pivotal movement of the back in the opposite direction.

17. The chair of claim 16, wherein said stop means comprises a. a first curvilinear section attached to each of said support legs at the upper region of said back and extending across the upper region at a downward angle, wherein said first curvilinear section has a radius of curvature less than that of said back, and wherein said back is pivotally attached to said support legs and first curvilinear section, and b. a second curvilinear section attached to said connecting means at the lower region of said back and extending across the lower region at said downward angle, wherein said second curvilinear section has a radius of curvature less than that of said back, and said downward angle is equal to about twenty-two degrees.

18. A chair, comprising:

a. a seat portion adapted to engage a user's seat;

b. a back portion generally perpendicular to said seat portion and adapted to engage a user's back and having upper, intermediate, and lower regions;

c. a frame for holding and supporting said seat and back portions, said frame comprising:

i. a pair of support legs which are pivotally connected to the intermediate region of said back portion and extending downward to a floor surface, forward along the floor surface, upward to the front of said seat portion, rearward to support said seat portion, and upward to attach to the lower region of said back portion at a location below the attachment of the legs to the intermediate region of said back portion, said legs diverging outwardly with respect to the floor surface with the legs spaced apart by more than the width of the seat portion in order to facilitate stacking;

ii. a first curvilinear section attached to each of said support legs at the intermediate region of said back portion and extending across the intermediate region at a downward angle, wherein said first curvilinear section has a radius of curvature less than that of said back portion, and wherein said back portion is pivotally attached to said support legs and first curvilinear section;

iii. second curvilinear section attached to each of said support legs at the lower region of said back portion and extending cross the lower region at said downward angle, wherein said second curvilinear section has a radius of curvature less than that of said back portion.

19. The chair of claim 18, wherein said back portion comprises a front and rear section which are attached together, such that the attachment of said support legs to said back portion is enclosed within said front and rear sections of said back portion.

20. The chair of claim 18, wherein said downward angle is equal to about twenty-two degrees.

21. The chair of claim 18, further comprising a plurality of stabilizing supports, each connected at right angles between said pair of support legs.

22. The chair of claim 21, wherein a first stabilizing support member is located between said pair of support legs in the rear portion of the frame at the height of the seat portion, and a second stabilizing support member is located between said pair of support legs in the front portion of the frame at a height halfway between the floor surface and the seat portion.

23. A seat back adapted to engage a user's back for use in a chair which flexes or tilts when a user leans back in said chair, and support means which are adapted to engage said seat back comprising:

a. a curved seat back portion;

b. curvilinear means forming part of said support means and having a radius of curvature less than that of said seat back portion;

c. mounting means for pivotally attaching the seat back portion to said support means, with interference between the curved seat back portion and the curvilinear means along matching curves providing the pivotal limits in both directions for tilting of the seat back portion.

24. The seat back of claim 23, wherein the tilting of said seat back causes the seat back portion to move away from said curvilinear means in a radial fashion, reengaging said curvilinear means at an angle determined by the relative radii of curvatures between said seat back portion and said curvilinear means.

25. A seat back for a chair adapted to engage a user's back and tilt with respect to a support when a user leans back in said chair, comprising:

a. a curved seat back;

b. a curved rod forming part of said support and having a radius of curvature less than that of said seat back;

c. mounting means for pivotally attaching the seat back to said curved rod, with interference between the curved seat back and the curved rod along matching curves providing the pivotal limits in both directions for tilting of the seat back.

26. The seat back of claim 25, wherein the tilting of said seat back causes the interior of the seat back to move away from said curved rod in a radial fashion, reengaging said curved rod at an angle determined by the relative radii of curvatures between said seat back and said curved rod.

27. The seat back of claim 26, wherein the tilting of said seat back causes the seat back to move away from said curved rod in a radial fashion, reengaging said curved rod at an angle determined by the relative radii of curvatures between said seat back and said curved rod.

28. A chair, comprising:

a. a seat adapted to engage a user's seat;

b. a back generally perpendicular to said seat and adapted to engage a user's back and having a top and a bottom and upper and lower regions between the top and bottom; and c. a flexible frame for holding and supporting said seat and back, said frame comprising:

i. a pair of support legs one at each side of the seat with each support leg having, (1) a resilient back leg portion attached by a first pivotal connection means to the upper region of said back below the top, (2) a bottom leg portion for extending along a floor surface, and (3) a front leg portion extending upwardly to the front of said seat to support said seat, and ii. second pivotal connection means connecting the rear of the seat to the lower region of the back at a location substantially above the seat, the flexibility of the frame and the first and second pivotal connection means for permitting the back to tilt toward a reclining position while the back functions as a lever against the resiliency of the back leg portion forcing the bottom of the back forwardly for lumbar support.

29. The chair of claim 28 in which the first and second pivotal connection means at the upper and lower regions of the back comprise curved struts extending across the back limiting tilting of the back both toward and away from the reclining position.

30. A chair, comprising:

a seat having an upper horizontal supporting surface adapted to engage a user's seat;

a back generally perpendicular to said seat and adapted to engage a user's back and having a top and a bottom and upper and lower regions between the top and bottom; and means for holding and supporting said seat and back, comprising:

a pair of support legs one at each side of the seat with each support leg having a resilient back leg portion attached by a first pivotal connection means to the upper region of said back below the top, a bottom leg portion for extending along a floor surface, and a front leg portion extending upwardly to the front of said seat to support said seat, and a second pivotal connection means connecting the rear of the seat to the lower region of the back at a location substantially above the *upper horizontal supporting surface of said* user's seat, the flexibility of the legs and the first and second pivotal [upper horizontal supporting surface of said] connection means for permitting the back to tilt toward a reclining position while the back functions as a lever against the resiliency of the back leg portion forcing the bottom of the back forwardly for lumbar support.

31. The chair of claim 30 with the chair back pivotal with respect to the seat between upright and reclined positions in which at least one of the pivotal connections means in the upper and lower regions of the back comprises;

A. a shaft having a pair of coaxial pivot sections each coupled to opposite sides of the seat back and an intermediate section spaced apart from the axis of the pivot sections so that the intermediate section moves with respect to the back as the back and shaft pivot with respect to each other, B. stop surfaces on the back spaced apart from the axis of the pivot sections for engaging the intermediate section to provide pivotal limits in both the upright and reclined positions, and C. with the shaft and the resilient back leg portion of the chair resiliently urging the back into the upright position whereby the frame is resiliently biased at rest so that the back is in the upright position and whereby pressure of the user's back against the chair back causes the back to tilt with respect to the seat toward, but not beyond the reclined position.

32. A seat back adapted to engage a user's back for use in a chair having a flexing frame which flexes when a user leans back in said chair, and support means which are adapted to engage said seat back comprising:

A. a seat adapted to engage a user's seat,

B. A curved seat back portion adapted to engage the user's back and pivot with respect to the seat in two directions between an upright position and a reclined position responsive to the flexing of the chair, C. a shaft connected to the frame and having a pair of coaxial pivot sections each coupled to opposite sides of the seat back and an intermediate section spaced apart from the axis of the pivot sections so that the intermediate section moves with respect to the back as the back and shaft pivot with respect to each other, D. stop surfaces on the back spaced apart from the axis of the pivot sections for engaging the intermediate section to provide pivotal limits in both the upright and reclined positions, and E. with the shaft and the flexing frame of the chair resiliently urging the back into the upright position whereby the frame is resiliently biased at rest so that the back is in the upright position and whereby pressure of the user's back against the chair back causes the back to tilt with respect to the seat toward, but not beyond the reclined position.

*33. A chair, comprising:*

*a seat having an upper horizontal supporting surface adapted to engage a user's seat;*

*a back generally perpendicular to said seat and adapted to engage a user's back and having a top and a bottom and upper and lower regions between the top and bottom; and*

*a pair of support legs one at each side of the seat with each support leg having a resilient back leg portion*

*attached by a first pivotal connection to the upper region of said back below the top, a front leg portion extending upwardly to the front of said seat to support said seat, and an intermediate portion connecting the front leg portion and the back leg portion;*

*a second pivotal connection connecting the rear of the seat to the lower region of the back at a location substantially above the upper horizontal supporting surface of said user's seat, the flexibility of the legs and the first and second pivotal connections permitting the back to tilt toward a reclining position while the back functions as a lever against the resiliency of the back leg portion forcing the bottom of the back forwardly for lumbar support.*

* * * * *